Patented June 20, 1950

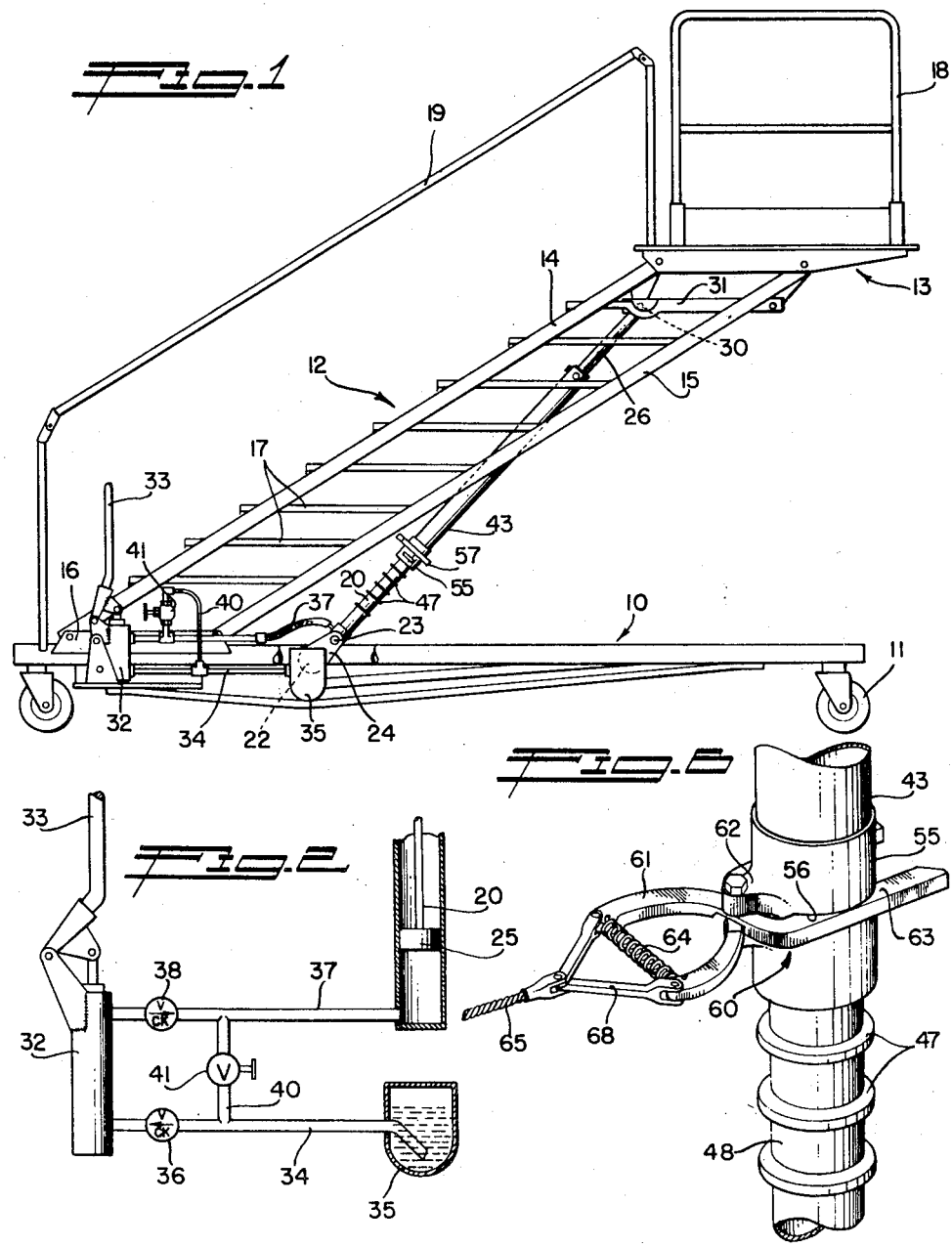

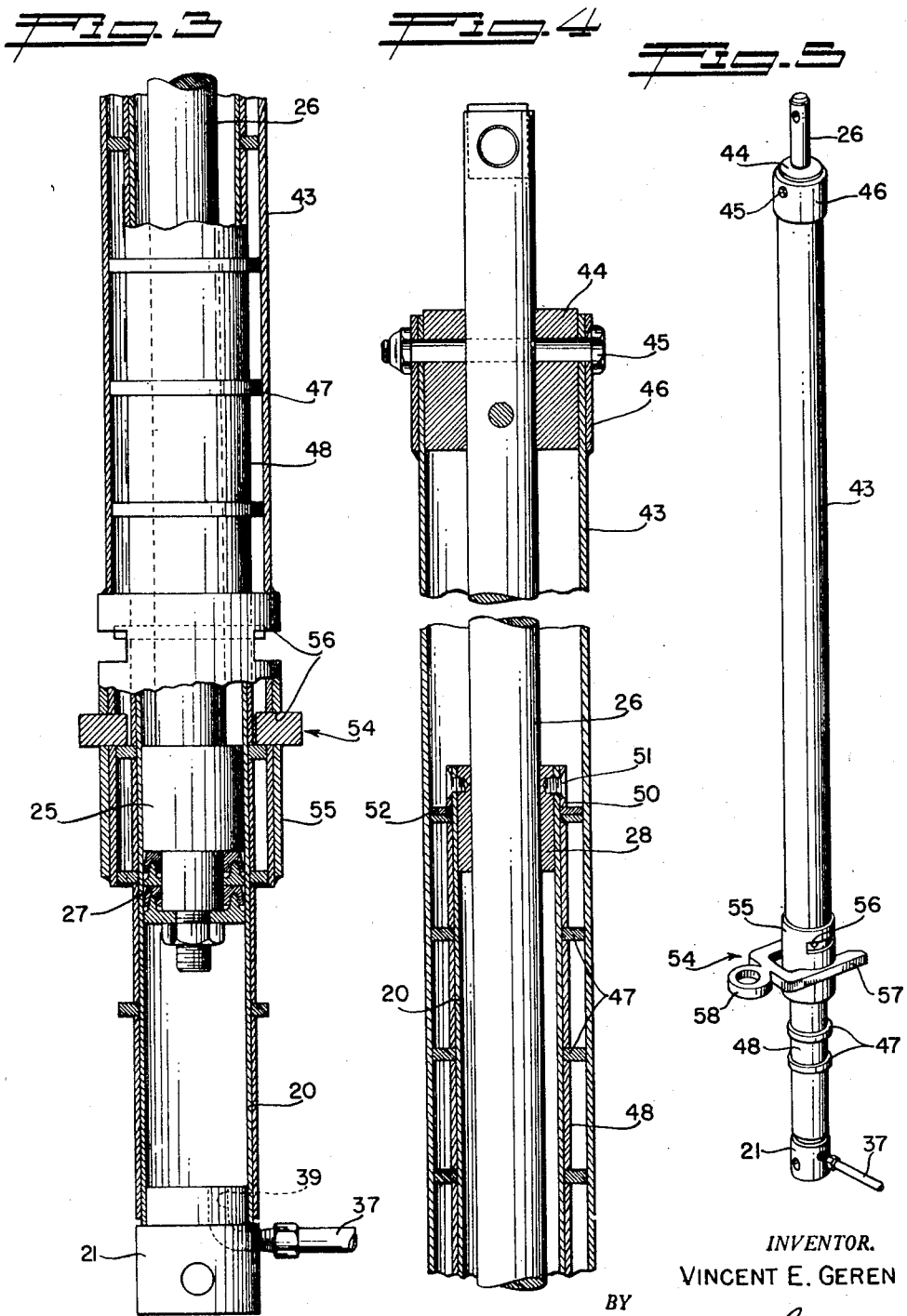

2,512,150

UNITED STATES PATENT OFFICE 2,512,150

HYDRAULIC RAM MECHANISM HAVING SHIELDING AND STOP MEANS

Vincent E. Geren, Los Angeles, Calif., assignor to Airquipment Company, Burbank, Calif.

Application January 8, 1947, Serial No. 720,857

10 Claims. (Cl. 121—40)

This invention relates to hydraulic ram mechanisms, and relates more particularly to mechanisms of this character employed to operate extensible stands used in the servicing of airplanes, passenger loading ramps for airplanes, etc.

The servicing of airplanes requires the use of elevated stages or stands which must be capable of vertical adjustment to allow the workmen to service the various parts of aircraft of different types and models. Other equipment used in connection with modern airplanes also necessitate vertical extension and contraction. For example, passenger loading ramps are often constructed for ready vertical adjustment to adapt them for use with various airplanes. Hydraulic ram mechanisms are usually incorporated in such devices to obtain the desired adjustments. Equipment of the class referred to is exposed to the weather, and the piston rods of the hydraulic actuating mechanisms are subjected to corrosion by the elements. This results in wear and damage to the ram piston rod and its bearings.

There is always the possibility that the extensible airplane servicing equipment will collapse as a result of hydraulic pressure failure, and it is customary to provide a safety lock to prevent such unintentional lowering of the equipment. The safety lock usually employed consists of a pin inserted through one of a plurality of transverse openings in the piston rod so as to bear against the upper end of the cylinder. The lock pin only locks the mechanism against movement in one direction; that is, against downward travel, and cannot prevent upward extension in the event excess hydraulic pressure is inadvertently applied to the ram. Furthermore, the transverse openings in the piston rod carry water and dirt into the cylinder when the mechanism is operated.

It is a general object of this invention to provide a ram mechanism of the general class above referred to which incorporates simple, effective means for protecting the ram piston rod and its bearings against corrosion and the effects of the elements. Heretofore the only protection provided for these parts was paint or grease, which quickly lost their protective abilities. The mechanism of this invention provides permanent and substantially complete protection for the piston rod and its bearings, thus insuring a longer life for the mechanism.

Another important object of the invention is to provide a ram mechanism of the type referred to embodying safety lock means adapted to dependably lock the ram mechanism against both upward extension and downward contraction in any selected position. The safety means of the invention is positive and dependable, insuring retention of the equipment at the selected elevation, even though the actuating hydraulic pressure is inadvertently either increased or decreased.

Another object of the invention is to provide a mechanism of the character referred to in which the safety lock means does not necessitate the provision of spaced openings in the piston rod or other surfaces or parts which might carry water and foreign material into the cylinder. The safety means is associated with the piston rod shielding assembly and is independent of the portion of the piston rod which enters the cylinder.

Another object of the invention is to provide a hydraulic ram mechanism in which the safety lock means may either be directly manually engaged and released, or constructed for remote manual control.

A further object of the invention is to provide a piston rod shielding means and safety lock means that may be conveniently embodied in or applied to the hydraulic ram mechanism without materially modifying or altering the same.

Other objects and features of the invention will be readily understood from the following detailed description of typical preferred forms of the invention wherein reference will be made to the accompanying drawings in which:

Figure 1 is a side elevation of an adjustable work stand embodying the present invention;

Figure 2 is a diagrammatic view of the fluid pressure system of the apparatus;

Figure 3 is an enlarged longitudinal detailed sectional view of the lower portion of the ram mechanism with certain parts appearing in side elevation;

Figure 4 is an enlarged longitudinal detailed sectional view of the upper portion of the ram mechanism;

Figure 5 is a reduced perspective view of the ram mechanism showing one form of locking device associated therewith; and, Figure 6 is a fragmentary perspective view of the ram mechanism illustrating another form of locking device.

The present invention is capable of embodiment in and application to hydraulic ram mechanisms intended for the actuation of various types of devices and equipment. In the drawings I have shown the ram mechanism incorporated in an extensible stand or staging useful in the construction and servicing of airplanes. It is to be understood that this is merely one typical application and is not to be construed as restrictive of the use of the invention.

The extensible stand illustrated includes a wheeled base 10 comprised of longitudinal and transverse members secured together to form a rectangular frame. The frame or base 10 is carried by wheels 11 equipped with suitable tires. A pivotally supported ladder or step structure 12 is mounted on the base 10 and carries a horizontal work platform 13. The step structure includes two pairs of upright side members 14 and 15 pivoted at their lower ends to plates 16 on the base 10. The upper ends of the four members 14 and 15 are pivoted to the horizontal platform 13. The pivotal axes of the members 14 and 15 are such that the members remain parallel at all times, and the platform 13 remains parallel with the base 10. Suitable spaced steps 17 extend between and are pivotally connected to the side members 14 and 15 to provide free access to the platform 13. The parallel relationship of the members 14 and 15 holds the steps 17 horizontal in all elevations of the platform. A guard rail 18 is provided for platform 13 and suitable rails 19 are associated with the ladder or step assembly. It is to be understood that the work stand may include other features, but these are omitted from the present disclosure as being unnecessary to a full understanding of the invention.

The features of the present invention are incorporated in a hydraulic ram mechanism for raising and lowering the platform 13. This mechanism includes an elongate cylinder 20 provided at its lower end with a plug or cap 21. The cylinder cap 21 is pivoted on a cross member 22 of the base 10 by a pin 23 passing through horizontal openings in the cap and lugs 24 on the cross member. A plunger 25 operates in the cylinder 20 and has a piston rod 26 extending upwardly and outwardly from the cylinder. The lower portion of the plunger 25 carries a suitable sealing ring assembly 27 for slidably sealing with the cylinder 20, and the plunger has a bearing surface adjacent the packing ring assembly for engaging with the cylinder wall. The piston rod 26 slidably passes through a bearing 28 in the upper end of the cylinder 20 and its projecting upper end is pivotally connected with the platform 13. In the drawings I have shown the upper end of the piston rod pivoted at 30 to a stabilizing assembly 31 depending from the platform 13.

Figure 5 illustrates in a diagrammatic manner the system for supplying the actuating fluid pressure to the cylinder 20. This system includes a pump 32 mounted on the base 10 and operated by a hand lever 33. A line 34 leads from a liquid reservoir 35 to the inlet of the pump 32, being controlled at the pump by a check valve 36. A pressure line 37 extends from a check valve 38 at the outlet of the pump to the cap 21 of the cylinder 20 where it communicates with a port 39. The port 39 in turn communicates with the interior of the cylinder 20. A by-pass pipe 40 connects the two lines 34 and 37 and is controlled by a manually operable valve 41. It will be seen that with the valve 41 closed, operation of the pump 32 supplies fluid under pressure to the cylinder 20 to elevate the step assembly 12 and platform 13. The valve 41 may be subsequently opened to allow the stand to lower. By suitable manipulation of the pump 32 and valve 41, the platform 13 may be brought to any required position.

The platform 13 may be operated to a substantial elevation by the above described ram mechanism. This extends a considerable portion of the piston rod 26 from the upper end of the cylinder 20. The protective shield means of the invention effectively guards the extended portion of the piston rod 26 against the action of the elements and against the accumulation of dirt. The protective means includes an elongate sleeve 43 secured to the upper end portion of the rod 26. In the construction illustrated, a tubular block or spacer 44 is arranged in the upper portion of the sleeve, and one or more bolts 45 pass through transverse openings in the sleeve 43, spacer 44 and rod 26 to secure the sleeve to the rod. The upper portion of the sleeve 43 which contains the spacer 44, may be reinforced by an external collar 46. The protective sleeve 43 surrounds the piston rod 26 in spaced concentric relation thereto and is of sufficient diameter to telescope over the cylinder 20 with substantial clearance. The sleeve 43 is also sufficiently long to extend downwardly over a considerable portion of the cylinder 20, even when the piston rod 26 is in its uppermost or fully extended position. The shielding portion of the sleeve 43; that is, the major portion of the sleeve extending downwardly from the spacer 44 and telescoping over the cylinder 20, is imperforate or fully closed to completely exclude water, dirt, dust, etc. As will be later described, the protective sleeve 43 is centered and slidably guided on the cylinder 20 by elements of the safety lock means.

The lock means of the invention includes a plurality of stop or lock members longitudinally spaced along the exterior of the cylinder 20. In the preferred construction these members are in the form of rings 47 surrounding the cylinder 20 at longitudinally spaced points. The rings 47 rather accurately fit around the cylinder 20 and their peripheries are cylindrical to form spaced guides and bearings for the sleeve 43. Figures 3 and 4 illustrate the manner in which the inner surface of the sleeve 43 slidably rides on the peripheries of the rings 47 to support and guide the sleeve. The retaining rings 47 are spaced along substantially the entire length of the cylinder 20 by intervening tubular spacers 48. The spacers 48 may be simple tubular members engaged around the cylinder 20 between the successive rings 47. The lowermost spacer 48 which may be of greater length than the other spacers, may either rest on the cap 21 or may be welded on the cylinder 20, or both. The other spacers 48 and the retainer rings 47 may be simply stacked on the cylinders 20 in superimposed relation; or if desired, may be individually secured to the cylinder as by welding. A collar 50 is secured to the upper end of the cylinder 20 by screws 51 or the like, to prevent upward displacement of the rings 47 and spacers 48. A series of shims 52 is engaged between the upper spacer 48 and the collar 50 to compensate for manufacturing tolerances in building up the series of rings and spacers. The shims 52 may serve as the uppermost stop or retainer ring of the lock means. It will be observed that the series of rings 47 slidably cooperating with the interior of the protective sleeve 43 exclude moisture and dirt from the interior of the sleeve, and in addition, constitute bearings for the sleeve as above described.

The lock means further includes a locking element 54 adapted to be engaged on the lower portion of the sleeve 43 to cooperate with the adjacent stop rings 47. The lower portion of the sleeve 43 is externally reinforced by a collar 55 welded or otherwise fixed on the sleeve. The thickened or reinforced lower portion of the sleeve 43 is provided with two vertically spaced pairs of slots 56 to receive the lock element. The slots 56 of each pair are horizontal or normal to the longitudinal axis of the ram assembly, and are formed in diametrically opposite sides of the sleeve. The lock element 54 is substantially U-shaped in plan view, having a pair of spaced parallel arms 57 joined at one end. The opposite ends of the arms 57 are bevelled at their inner corners to be readily entered in the slots 56. The arms 57 of the lock element are proportioned to fit the slots 56 and to project into the interior of the sleeve 43 when engaged in the slots. The arms 57 engaged in a pair of slots 56 are in the path of the adjacent retainer rings 47 and upon engaging a ring 47, stop the travel of the sleeve 43 and piston rod 26 relative to the cylinder 20. Thus the arms 57 of the locking device 56 prevent any substantial movement of the platform 13 in the event the hydraulic pressure in the cylinder 20 is either increased or reduced subsequent to locking the apparatus at the selected elevation. A handle or ring 58 is provided on the locking element 54 to facilitate its manipulation. Where the locking element 54 is a simple manually inserted device, as shown in Figures 3 and 5, it is preferred to provide two vertically spaced pairs of slots 56 so that in the event the platform 13 is stopped in a selected position where a retainer ring 47 prevents introduction of the arms 57 into one pair of slots, the other pair of slots is unobstructed to receive the locking arms. The pairs of slots 56 have a different spacing than the rings 47 so that one pair of slots is available to receive the locking device 54 at all times.

Figure 6 illustrates a remotely controllable locking device 60. In this form of the invention, only one pair of slots 56 is required in the wall of the sleeve 43. In all other respects the sleeve 43, lock rings 47, spacers 48, etc., are the same as described above. The locking device 60 comprises a pair of crossed levers 61 pivoted between spaced lugs 62 on the reinforcing collar 55. Each lever 61 has an arm 63 for engaging in a slot 56 so as to cooperate with the retainer rings 47. A spring 64 is engaged between the outer arms of the crossed levers 61 to yieldingly urge the levers to positions where the arms 63 are adapted to cooperate with the rings 47. Remotely controllable or operable means is provided for pivoting the levers 61 to withdraw their arms 63 from the slots 56. This means includes a cable 65 connected with the two levers 61. I have shown the cable 65 attached to inturned fingers or links 68 on the outer arms of the levers. The cable 65 may extend to any selected conveniently accessible operating point. When it is desired to release the locking device 60 to permit free extension or contraction of the work stand, the cable 65 is pulled. This swings the lever arms 63 out of the slots 56 and therefore out of alignment with the stop rings 47. At all other times the spring 64 holds the arms 63 in position in the slots 56 to effectively prevent movement of the piston rod 26 and platform 13. Even in the event the platform 13 and piston rod 26 are stopped in a position where a retainer ring 47 is directly opposite the slots 56, any subsequent movement of the piston rod in either direction moves the ring out of alignment with the slots to allow the lever arms 63 to automatically move into the active positions where they prevent any further appreciable movement of the platform 13.

It is believed that the operation of the apparatus will be readily understood from the foregoing detailed description. To raise the platform 13 the pump 32 is operated to supply fluid under pressure to the cylinder 20. This operation is terminated when the platform 13 has reached the required position. The locking element 54 of Figure 5, is then arranged so that its arms 57 fit a pair of slots 56. As above described, the arms 57 enter the sleeve 43 to be in the space between the adjacent pair of retainer rings 47. Accordingly, the arms 57 are in position to prevent either upward or downward displacement of the platform 13 in the event the fluid pressure in the cylinder 20 is inadvertently increased or decreased. Where the automatic lock device 60 of Figure 6 is employed, the lever arms 63 are retracted from the interior of the sleeve 43 during intended elevation and depression of the platform 13. This is accomplished by merely imposing a pull on the cable 65. When the platform 13 has reached the selected position, the cable is released, allowing the spring 64 to move the lever arms 63 into the active positions in alignment with the adjacent retainer rings 47.

The closed protective sleeve 43 secured to the upper end of the piston rod 26 and telescoping downwardly over the cylinder 20 effectively shields the projected portion of the piston rod 26. The sleeve 43 prevents water, dust and dirt from reaching the piston rod and its bearings. As a result, repeated operation of the ram mechanism does not carry water and foreign matter into the cylinder to corrode and wear the working parts and bearings. This materially lengthens the active life of the ram mechanism.

Having described only typical forms of the invention, I do not wish to be limited to the specific details herein set forth, but wish to reserve to myself any variations or modifications that may appear to those skilled in the art and/or fall within the scope of the following claims.

I claim:

1. In a mechanism of the class described the combination of; a cylinder, a piston operable in the cylinder and having a rod extending from an end of the cylinder, a sleeve secured to the extending portion of the rod and extending over the cylinder in surrounding relation thereto to protect the same, axially spaced projections on the exterior of the cylinder slidably engaged by the interior of the sleeve to constitute bearings for the sleeve, and a part on the sleeve cooperable with said projections to limit relative axial movement between the cylinder and the piston.

2. In a mechanism of the class described the combination of; a cylinder, a piston operable in the cylinder and having a rod extending from an end of the cylinder, a sleeve secured to the extending portion of the rod and extending over the cylinder in surrounding relation thereto to protect the same, axially spaced annular projections on the exterior of the cylinder slidably engaged by the internal surface of the sleeve to form guide bearings for the sleeve, and an element on the sleeve projectable thereinto to be engageable with said projections to prevent relative axial movement between the cylinder and piston.

3. A ram mechanism comprising two parts related for relative longitudinal movement, one a cylinder, the other a piston operable in the cylinder, a rod on the piston extending from an end of the cylinder, a sleeve attached to the rod to enclose the projecting portion of the same and to telescope over the cylinder, longitudinally spaced stops on the cylinder, an end portion of the sleeve having a pair of longitudinally spaced slots, and an element engageable in a selected slot and cooperable with said stops to limit relative movement between the cylinder and piston in both directions.

4. In a ram mechanism the combination of; a cylinder, longitudinally spaced annular projections on the exterior of the cylinder, a piston operable in the cylinder, a rod on the piston projecting from an end of the cylinder, a sleeve secured to the rod to enclose the projecting portion of the same and telescoping over the cylinder to be slidably guided by said projections, said annular projections serving to prevent the entrance of foreign matter into the sleeve, and a locking device on the sleeve for projecting into the space between spaced adjacent annular projections to be cooperable with said adjacent projections to limit relative longitudinal movement between the cylinder and piston.

5. A ram mechanism comprising two parts related for relative longitudinal movement, one a cylinder, the other a piston operable in the cylinder, a rod on the piston extending from an end of the cylinder, a sleeve attached to the rod to enclose the projecting portion of the same and to telescope over the cylinder, stop rings on the exterior of the cylinder forming bearings for the sleeve, spacers holding the rings in spaced apart relation, and a locking device on the sleeve for projecting into the space between spaced adjacent rings to limit the relative movement between the cylinder and piston.

6. A ram mechanism comprising two parts related for relative longitudinal movement, one a cylinder, the other a piston operable in the cylinder, a rod on the piston extending from an end of the cylinder, a sleeve attached to the rod to enclose the projecting portion of the same and to telescope over the cylinder, the sleeve having a slot, longitudinally spaced rings on the exterior of the cylinder engaged by and forming bearings for the sleeve, and means for preventing appreciable relative movement between the cylinder and piston with the rod in any selected position comprising a lock element for engaging in said slot to extend into the space between two adjacent rings.

7. A ram mechanism comprising two parts related for relative longitudinal movement, one a cylinder, the other a piston operable in the cylinder, a rod on the piston extending from an end of the cylinder, a sleeve attached to the rod to enclose the projecting portion of the same and to telescope over the cylinder, the sleeve having a pair of substantially diametrically opposite slots, longitudinally spaced rings on the exterior of the cylinder slidably engaged by the internal surface of the sleeve to form bearings for the sleeve, and means for limiting relative movement between the cylinder and piston when the same are in a selected relative relationship comprising a lock element having arms for entering said slots to project into the space between a pair of adjacent rings.

8. A ram mechanism comprising two parts related for relative longitudinal movement, one a cylinder, the other a piston operable in the cylinder, a rod on the piston extending from an end of the cylinder, a sleeve attached to the rod to enclose the projecting portion of the same and to telescope over the cylinder, the sleeve having a pair of substantially diametrically opposite slots, longitudinally spaced rings on the exterior of the cylinder, and means for limiting relative movement between the cylinder and piston when the same are in a selected relative relationship comprising a U-shaped lock insertable into said slots to project into the space between a pair of adjacent rings.

9. A ram mechanism comprising two parts related for relative longitudinal movement, one a cylinder, the other a piston operable in the cylinder, a rod on the piston extending from an end of the cylinder, a sleeve attached to the rod to enclose the projecting portion of the same and to telescope over the cylinder, the sleeve having a pair of substantially diametrically opposite slots, longitudinally spaced rings on the exterior of the cylinder, and means for limiting relative movement between the cylinder and piston when the same are in a selected relative relationship comprising a pair of crossed levers on the sleeve for entering said slots to project into the space between a pair of adjacent rings.

10. A ram mechanism comprising two parts related for relative longitudinal movement, one a cylinder, the other a piston operable in the cylinder, a rod on the pison extending from an end of the cylinder, a sleeve attached to the rod to enclose the projecting portion of the same and to telescope over the cylinder, the sleeve having a pair of substantially diametrically opposite slots, longitudinally spaced rings on the exterior of the cylinder, and means for limiting relative movement between the cylinder and piston when the same are in a selected relative relationship comprising a pair of crossed levers on the sleeve for entering said slots to project into the space between a pair of adjacent rings, spring means for urging the levers into the slots, and manually operable means for withdrawing the levers from said space.

VINCENT E. GEREN.

REFERENCES CITED

The following references are of record in the file of this patent:

UNITED STATES PATENTS

| Number | Name | Date |
|---|---|---|
| 1,512,837 | Evenden | Oct. 21, 1924 |
| 1,525,447 | Hose | Feb. 10, 1925 |
| 1,927,078 | Weeks | Sept. 19, 1933 |
| 2,258,825 | Thompson | Oct. 14, 1941 |
| 2,362,170 | Swaisgood | Nov. 7, 1944 |
| 2,372,196 | Grime | Mar. 27, 1945 |

FOREIGN PATENTS

| Number | Country | Date |
|---|---|---|
| 338,918 | Great Britain | Dec. 1, 1930 |
| 507,588 | France | Jan. 29, 1920 |